United States Patent [19]

Nagai

[11] Patent Number: 4,538,712
[45] Date of Patent: Sep. 3, 1985

[54] CLUTCH BRAKE ARRANGEMENT FOR FARM WORKING MACHINERY ETC.

[75] Inventor: Shigeo Nagai, Nagano, Japan

[73] Assignee: Nisshin Kogyo Kabushiki Kaisha, Japan

[21] Appl. No.: 463,563

[22] Filed: Feb. 3, 1983

[30] Foreign Application Priority Data

Feb. 19, 1982 [JP] Japan .............................. 57-22406[U]
Feb. 19, 1982 [JP] Japan .............................. 57-24407[U]

[51] Int. Cl.³ ............................................. B60K 41/24
[52] U.S. Cl. ................................................. 192/18 R
[58] Field of Search ................. 192/12 R, 18 R, 17 R, 192/15; 56/11.3, 11.7, 11.8

[56] References Cited

U.S. PATENT DOCUMENTS

| | | | |
|---|---|---|---|
| 4,212,141 | 7/1980 | Miyazawa et al. | 56/11.3 |
| 4,286,701 | 9/1981 | MacDonald | 192/18 R |
| 4,313,293 | 2/1982 | Nagai | 56/11.3 |
| 4,333,303 | 6/1982 | Plamper | 56/11.3 |
| 4,372,433 | 2/1983 | Mitchell et al. | 192/18 R |
| 4,418,808 | 12/1983 | Nagai | 192/18 R |

*Primary Examiner*—George H. Krizmanich
*Attorney, Agent, or Firm*—Cantor and Lessler

[57] ABSTRACT

A clutch brake arrangement for farm working machinery etc., includes a boss parallel with an output shaft extending from an engine mount, a rotary member rotatably mounted on the output shaft, a pressure plate mounted on the boss in such a manner that it is slidable along the axial direction of the output shaft, the plate being provided for pressing a lining plate rotatable with the rotary member, a brake spring resiliently disposed between the engine mount and the pressure plate, and cam plates opposed to each other through the pressure plate and a cam ball and fitted over the end of the boss by a retaining ring. In this way, the arrangement can be brought near the engine mount, whereby the length, as viewed in the axial direction of the output shaft, and hence size of the arrangement can be decreased. Furthermore, since the movement of the operating mechanisms along the axial direction of the output shaft is slidably guided by the boss, the parallel movement thereof is made so smooth and reliable that clutch engagement and disengagement can effectively be carried out. A variation of the foregoing arrangement wherein a dust cover for covering the arrangement is attached directly to the engine mount, and between the duct cover and the pressure plate is resiliently disposed a brake spring, by which the dust cover is engaged with, and held on, the engine mount. In this way, it is possible to simplify and make sure the mounting structure of the dust cover, thus resulting in a decrease of the number of the parts involved and improvements in working efficiency.

10 Claims, 8 Drawing Figures

CLUTCH BRAKE ARRANGEMENT FOR FARM WORKING MACHINERY ETC.

BACKGROUND OF THE INVENTION

The present invention relates to a clutch brake arrangement for farm working machinery etc., and more particularly to a clutch brake arrangement for farm working machinery etc., which causes smooth and reliable movement of a pressure plate toward an output shaft in a simplified manner, reduces as much as possible the amount of a load applied on an engine when the engine is switched from idling over to clutch engagement, assures smooth clutch engagement with no fear of an engine stop, allows clutch disengagement and braking by release of an operating rod, and is of small size and light weight.

For example, when a power-operated lawn mower is moved to cut the grass in varied places, it is required to stop the rotation of a cutting tool while idling an engine to save the labor involved in re-actuation of the engine and for safety's sake.

The conventional clutch brake arrangements known in the art typically include an engine mount, a cam plate fixed to the engine mount and a cam plate cover rotatable by an operating rod. The cam plate and the cam plate cover are fitted over an output shaft in an opposite manner. A cam ball is received in a ball clamp having opposite inclined faces. When the operating rod is turned in its operating direction, the cam plate cover moved away from the cam plate by the rolling movement of the cam ball. A pull is then given to a pressure plate biased toward a rotary member and engaged with a lining plate by a brake spring, whereby the lining plate is engaged with the clutch disc for unison rotation of the rotary member and the clutch disc. On the other hand, release of the operating rod causes the pressure plate to move by the brake spring, thereby to give a push to the lining plate. As a result, the lining plate disengages the clutch disc for braking, and the cam plate cover toward the cam plate, and returns to the initial position.

According to the known arrangements, the movement of the pressure plate toward the output shaft can be achieved in a simple manner. Furthermore, smooth clutch engagement is assured with no fear of an engine stop, since it is possible to reduce as much as possible the amount of a load applied on the engine when it is switched from idling over to clutch engagement. To add to this, clutch disengagement is effected by release of the operating rod for braking.

However, these arrangements have a disadvantage that their overall size increases in the direction of axis of the output shaft, since the mechanism for engaging or disengaging the lining plate with or out of the clutch disc rotating with the output shaft is fitted over the output shaft extending from the engine mount. Care should also be taken to cause smooth and reliable parallel movement of that mechanism along the axial direction of the output shaft.

In order to prevent grass, weeds, earth and sand as well as mud from entering the arrangements, a dust cover is further provided to close up the gaps therein. Nonetheless, it is likely that such matters may enter the arrangement from small gaps, and accumulate therein so that the smooth operation of a cam mechanism is disturbed. Furthermore, the assembling of the dust cover is complicate, troublesome, etc.

SUMMARY OF THE INVENTION

The present invention provides a clutch brake arrangement for farm working machinery, etc., including an engine mount, a boss parallel with an output shaft extending from the engine mount, a spring holder located along the axial direction of the output shaft and formed around the part of the boss from which it is extended, a rotary member rotatably mounted on the output shaft, a lining plate mounted on the rotary member, a pressure plate provided on the boss for pressing the lining plate in such a manner that it is slidable along the axial direction of the output shaft, a brake spring resiliently disposed between the spring holder and the pressure plate so as to constantly bias the pressure plate toward the lining plate, and cam plates opposed to each other through the pressure plate and a cam ball and fitted over the end of the boss by a retaining ring; said pressure plate being moved along the axial direction of the output shaft under the cam action exerted by the rotation of the cam plates, whereby the lining plate is engaged with, or disengaged out of, a clutch disc rotatable with the output shaft for clutch engagement or disengagement.

An object of the present invention is to bring the arrangement near the engine mount by attaching the aforesaid operating mechanisms to the boss of the engine mount, thereby reducing the length, a viewed in the axial direction of the output shaft, and hence size of the arrangement, and to easily mount the operating mechanisms on the boss parallel with the output shaft of the engine mount at right angles with the output shaft, whereby the movement of the operating mechanisms along the axial direction of the output shat is slidably guided by the boss, so that the smooth and reliable parallel movement thereof is secured, this clutch engagement of disengagement is assured.

The present invention also provides a clutch brake arrangement including a rotary member rotatably mounted on an output shaft extending from an engine mount, a pressure plate provided in such a manner that it is movable along the axial direction of the output shaft under the cam action exerted by the rotation of an operating rod, and a lining plate secured on the rotary member, with or out of which a clutch disc rotatable with the output shaft is engaged of disengaged in association with the movement of the pressure plate for clutch engagement or disengagement, wherein a dust cover for covering the arrangement is attached directly to the engine mount, and between the dust cover and the pressure plate is resiliently disposed a brake spring, by which the dust cover is engaged with, and held on, the engine mount.

Another object of the present invention is to simplify and make sure the mounting structure of the dust cover for preventing foreign matters such as grass, weeds, earth and sand as well as mud from entering the arrangement, thereby reducing the number of the parts involved and making improvements in working efficiency, and to render the operation of the clutch brake smooth by preventing, to the utmost, the entrance and accumulation of such foreign matters in the arrangement.

BRIEF DESCRIPTION OF THE DRAWINGS

FIGS. 1 to 5 inclusive show one embodiment wherein the present invention is applied to a power-operated lawn mower.

FIGS. 6 to 8 inclusive show another embodiment wherein the present invention is applied to a power-operated lawn mower.

DETAILED DESCRIPTION OF THE INVENTION

Referring to the drawings, in particular to FIGS. 1 to 4, an engine mount generally shown at 1 is formed as by die casting, and includes an integral member comprising a boss 1a having a centrally axial bore 2 through which an output shaft 4 passes, a spring holder 1b located along the axial direction of the output shaft and formed around the part of the boss 1a from which it extends upwards, and a dust cover 1c which is concentric with respect to the boss 1a, and extends downwards to protect the arrangement. After die casting, the outer face 1d of the boss 1a is made parallel with the inner face of the bore 2 by cutting. Thus, paralleling of both faces can easily and exactly be achieved. The boss 1a is formed at its lowermost end with a dent 1e, into which a bearing assembly 3 is fitted. The output shaft 4, which is connected to a crank shaft (not illustrated) of an engine, extends downwards through the bearing assembly 3.

Figure 1:
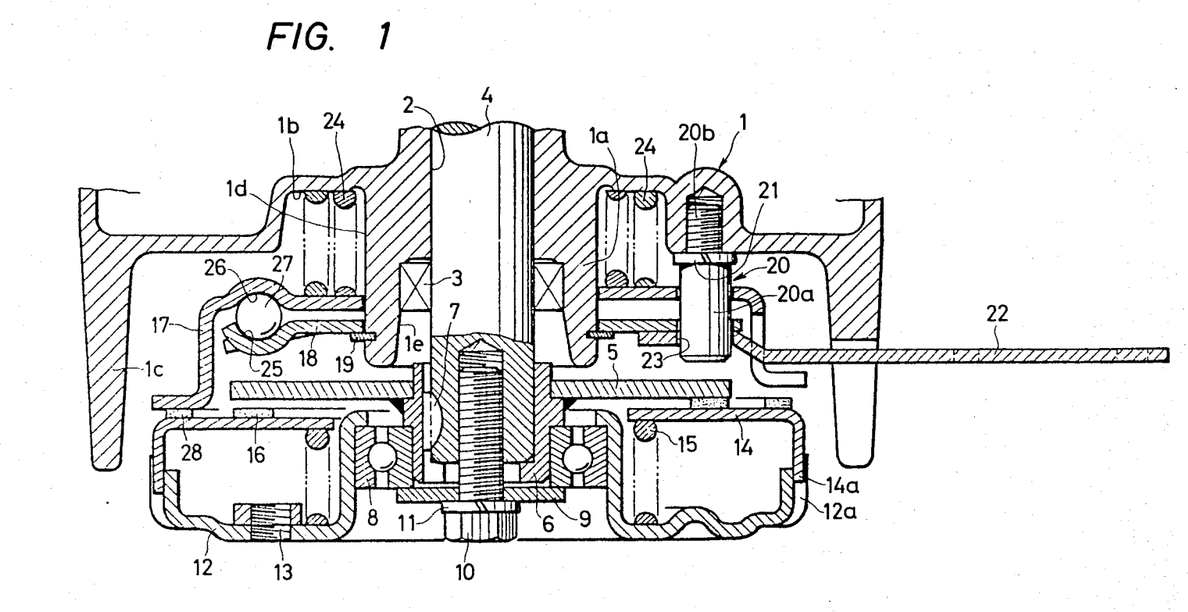
FIG. 1 is a sectioned front view, FIG. 2 a partly cut-away plan view, FIG. 3 a sectional view showing part of another example, FIG. 4 a sectional view showing part of a further example.

A clutch disc 5 is fixed to a collar member 6, and fitted to the end of the output shaft 4 by engaging a woodruff key 7 therewith. A washer 9 is provided to hold a collar member 6 and a bearing assembly 8 fitted into the outer face of the collar member 6. A fixing bolt 10 is threaded into the end of the output shaft 4 through a spring washer 11, whereby the clutch disc 5 is rotatable in unison with the output shaft 4.

A rotary member 12 is rotatably mounted on the output shaft 4 through the said bearing assembly 8, and has a cutting blade (not shown) provided on, and being rotatable in unison with its bottom face by a set screw (not shown) threaded into a tapped hole 13.

A lining plate 14 is disposed between the rotary member 12 and the clutch disc 5, and has its one end bent toward the rotary member 12 to form a guide piece 14a. The guide piece 14a is fitted into a relative guide portion 12a formed at the peripheral edge of the rotary member 12. Thus, the lining plate 14 is rotatable in unison with the rotary member 12, and movable parallel with the output shaft 4.

Between the rotary member 12 and the lining plate 14, there is resiliently disposed a clutch spring 15 to constantly bias the lining plate 14 toward the clutch disc 5. This assures that a clutch lining 16 fixed over the lining plate 14 engages the clutch disc 5.

It is noted that a pressure plate 17 and a cam plate 18 are arranged around the outer face 1d of the said boss 1a, and that a retaining ring 19 is fitted over the lower end of the boss 1a to prevent disengagement of the cam plate 18.

The engine mount 1 is threadedly provided with a bolt stopper 20 through a spring washer 21 in a position outside of the spring holder 1b, said stopper being parallel with the boss 1b. The straight portion 20a of the bolt stopper 20 is formed with an elongated slot 23 through which the pressure plate 17, the cam plate 18 and an operating rod 22 fixed thereto are inserted. Between the spring holder 1b and the pressure plate 17, there is resiliently disposed a brake spring 24. Although, in the illustrated embodiment, two brake springs 24 are provided to produce an increased resilient force, one brake spring would suffice if the required resilient force is obtained.

Thus, the pressure plate 17 is always biassed toward the lining plate 14.

To assemble these parts in place, the threaded portion 20b of the bolt stopper 20 is fixedly provided in the engine mount 1. Then, the pressure plate 17 and the cam plate 18 are inserted into the straight portion 20a via the brake springs 24 for fixation to the boss 1a. Finally, the retaining ring 19 is fixedly fitted over the boss 1a.

In this way, the brake springs 24, the pressure plate 17 and the cam plate 18 are positioned on the side of the engine mount 1, whereby the clutch disc 5 and the rotary member 12 attached to the output shaft 4 extending downwards from the engine mount 1 can be brought near the engine mount 1. As a result, the arrangement can be made small, since the length thereof, as viewed in the axial direction of the output shaft, can be reduced.

According to the present invention, the pressure plate 17 and the cam plate 18 can easily be positioned in the boss 1a arranged parallel with the output shaft 4 of the engine mount 1 is precisely perpendicular relation to the output shaft 4. Furthermore, the pressure plate 17 can slidably be guided around the boss 1a for easy and reliable parallel movement thereof.

It should be noted that, when the engine mount 1 is formed of an aluminium alloy etc., the outer face of the boss 1a may possibly be bit off by the sliding movement of the pressure plate 17; however, such biting-off is prevented if the pressure plate 17 is designed to slide over a retainer fitted over the boss 1a.

The cam plate 18 is provided on its face opposite to the pressure plate 17 with three ball clamps 25 each inclining and deepening in the operating direction of the rod 22, while the pressure plate 17 is provided on its face opposite to the cam plate 17 with the same number of ball clamps 26 each inclining and deepening in the counteroperating direction of the rod 22. Between the ball clamps 25 and 26, there are cam balls 27 which roll down the associated slopes.

When the cam balls 27 are found in the deepest positions of the ball clamps 25 and 26, the pressure plate 17 is located in a position nearest to the cam plate 18, where it engages the brake lining 28 of the lining plate 14 for braking. This position will hereinafter be referred to as the initial position of the operating rod 22.

When the pressure plate 17 moves in the axial direction of the output shaft during operation, the bolt stopper 20 serves as a guide together with the boss 1a, and when the pressure plate 17 engages the brake lining 28 of the lining plate 14 for braking, it receives a braking torque that is transmitted from the rotary member 12 to the pressure plate 17.

When the pressure plate 17 is found in the initial position where, under the action of the resilient force of the brake spring 24, and end 23a, as viewed in the operating direction, of the elongated slot 23 in the cam plate abuts against the bolt stopper 20, it engages the brake lining 28 of the lining plate 14, so that the clutch lining 16 remains spaced away from the clutch disc 5 at a given clearance. Thus, lever strokes are restricted so as to prevent dragging of the clutch lining 16 when the arrangement idles.

The foregoing embodiment operates as follows.

Left half of the FIG. 1 shows a braking state and right half shows a non-braking state.

Figure 2:
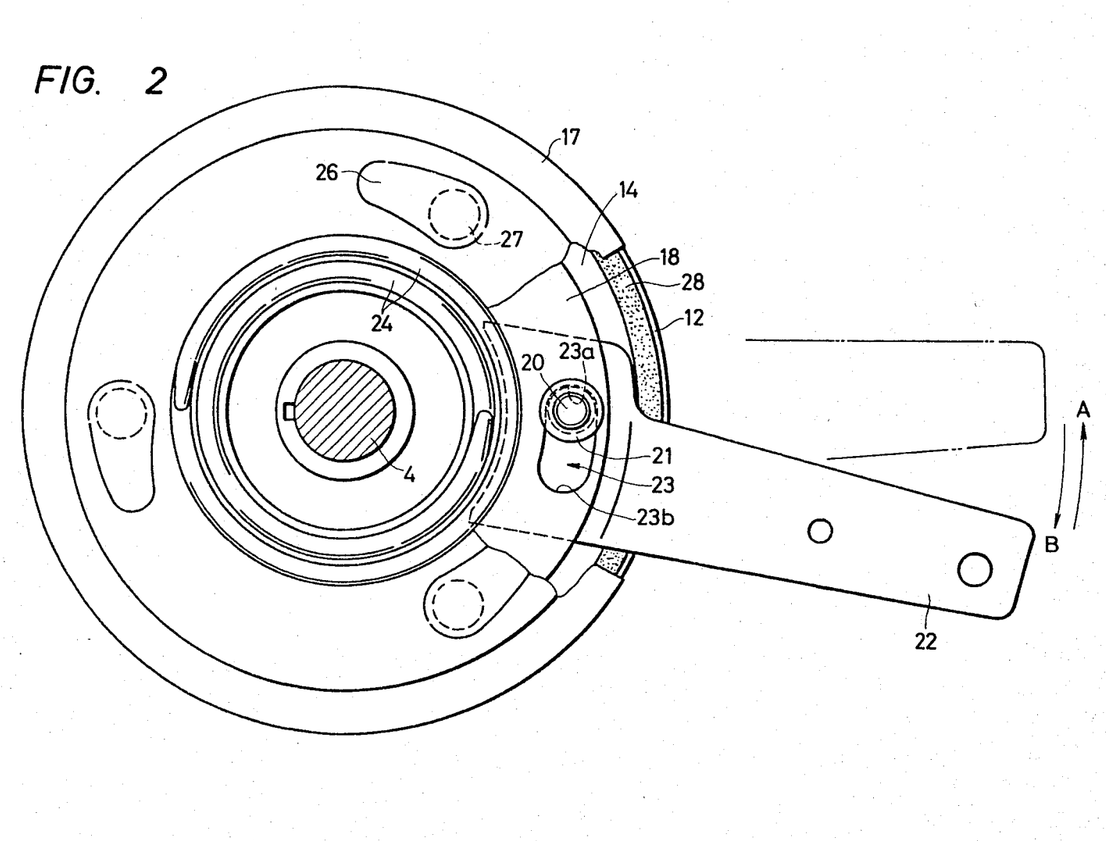

For braking, the brake spring 24 extends, and the cam balls 27 are located in the deepest positions of the ball clamps 25 and 26, so that the distance between the pressure plate 17 and the cam plate 18 is minimal, and the operating rod 22 is located in the initial position, as shown by a solid line in FIG. 2.

On the other hand, the lining plate 14 is engaged by the pressure plate 17 to contract the clutch spring 15, so that the clutch lining 16 remains spaced away from the clutch disc 5 at a given clearance. Accordingly, since both the output shaft 4 and the clutch disc 5 run idle even though the engine is at work, no rotational force is transmitted to the rotary member 12, and the cutting blade (not shown) is at rest while the engine is still kept idle.

To put the cutting blade in operation, the operating rod 22 is rotated in the direction shown by an arrow A in FIG. 2 into the non-braking state, viz., the rotating state as shown in the right half of the FIG. 1. That is, the operating rod 22 is rotated until the cam plate 18 is guided to the elongated slot 23, and the end 23b, as viewed in the non-operating direction, of the slot 23 abuts against the bolt stopper 20.

The cam balls 27 then roll up the slopes of the ball clamps 25 and 26, whereby the pressure plate 17 is guided into the boss 1a of the engine mount 1 and the bolt stopper 20, is spaced away from the cam plate 18 against the brake spring 24, and moves upwards in FIG. 1. Following the movement of the pressure plate 17, the lining plate 14 moves toward the clutch disc 5 while it comes in pressure contact with the pressure plate 17 under the action of the resilient force of the clutch spring 15. Subsequent contact of the clutch lining 16 with the clutch disc 5 causes that the lining plate initiates sliding while rotating, and comes up to a so-called semi-clutched state.

Further upward movement of the pressure plate 17 allows it to be spaced away from the lining plate 14, so that the lining plate 14 initiates rotating together with the clutch disc 5 for clutch engagement. In this way, the power of the output shaft 4 is transmitted to the rotary member 12 via the collar member 6, the clutch disc 5 and the lining plate 14 so as to turn the cutting blade.

Release of the cable etc. causes the operating rod 22 to rotate in a direction indicated by an arrow B in FIG. 2, return to the original position, and come up to a braking state a shown in the right half of FIG. 1. That is, the pressure plate 17 is pushed down in FIG. 1 by the resilient force of the brake spring 24 into engagement with the brake lining 28 to initiate braking, while the lining plate 14 is pushed down. The clutch lining 16 is then spaced away from the clutch disc 5, so that the lining plate 14 disconnects from the clutch disc 5. Thus, the rotation of the lining plate 14 is arrested to stop the rotation of the cutting blade. The braking torque, which is transmitted to the pressure plate 17, is then received by the bolt stopper 20 threaded into the engine mount 1 through the pressure plate 17.

Figure 3:
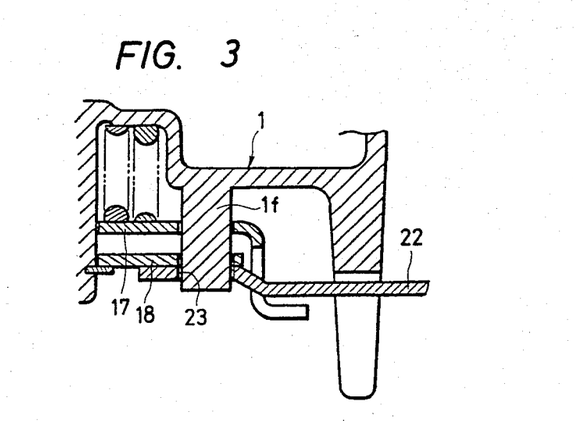
Figure 4:
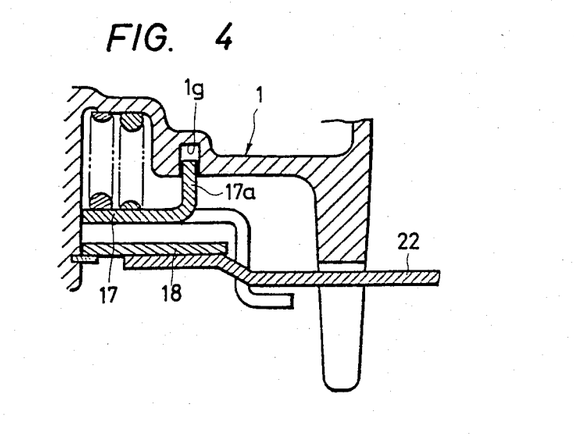

FIGS. 3 and 4 show another example wherein the bolt stopper 20 is not employed.

According to the example of FIG. 3, the engine mount 1 is integrally formed with a pin 1f which extends downwards and parallel with the boss 1a. The pin is inserted into a slot 23 formed in the mounting portions where the pressure plate 17, the cam plate 18 and the operating rod 22 are held in place. This example reduces the number of the parts involved, and makes assembling easier. Like the first example the pin 1f serves as a guide for the pressure plate 17 during braking, receives the braking torque which is transmitted to the pressure plate 17 during braking, and restricts the rotational stroke of the operating rod 22.

According to the example of FIG. 4, the engine mount 1 is slotted at 1g, and a pin 17a is slidably fitted into the slot 1g, said pin being formed by bending a portion of the pressure plate 17 toward the engine mount 1. In this way, the pressure plate 17 is smoothly guided by the fitting of the pin 17a into the slot 1g. When the movement of the pressure plate 17 toward the engine mount 1 reaches a given amount, the end of the pin 17a abuts upon the bottom of the slot 1g, so that the pin 17a does not move any more. In addition, the braking torque which is transmitted to the pressure plate 17 during braking is positively arrested since the side of the pin 17a abuts against the side wall of the slot 1g.

Figure 5:
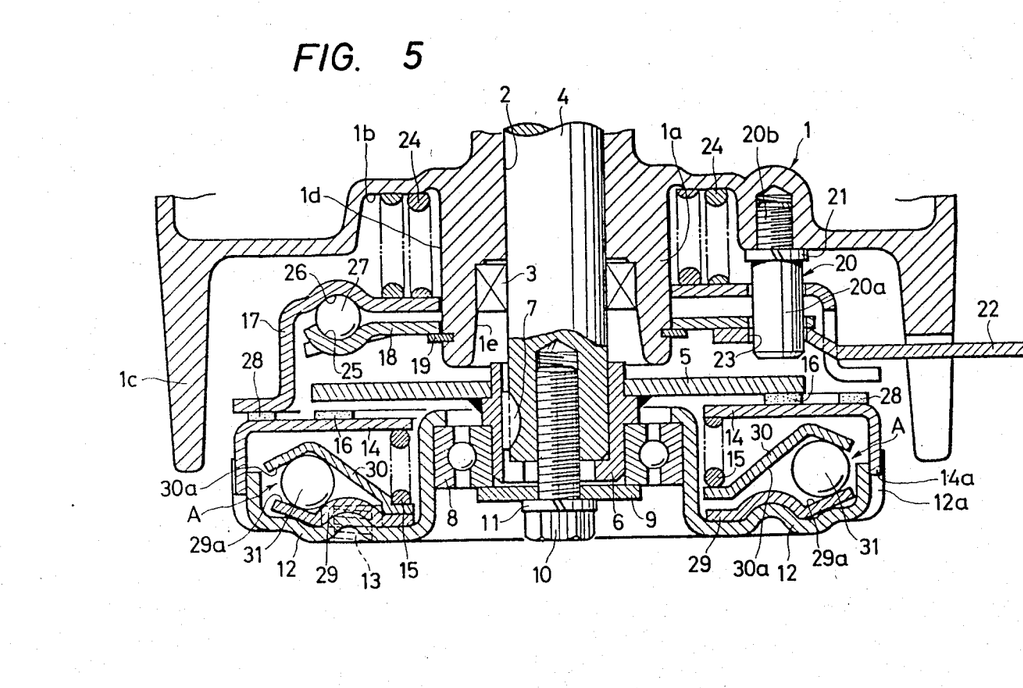
FIG. 5 is a sectioned front view showing a still further example including a centrifugal clutch mechanism.

FIG. 5 illustrates another example wherein the inventive clutch brake arrangement including a centrifugal clutch mechanism is applied to a power-operated lawn mower.

According to this example a centrifugal clutch mechanism A is provided between the rotary member 12 and the lining plate 14.

Like the first example, the engine mount 1 includes a boss 1a parallel with an output shaft 4 extending therefrom and a spring holder 1b located along the axial direction of the shaft 4, and provided around the portion of the boss 1a from which it is extended. A rotary member 12 is rotatably mounted on the output shaft 4, and includes a lining plate 14. A pressure plate 17 adapted to move the lining plate 14 is attached to the boss 1a in such a manner that it is slidable along the axis of the output shaft. A brake spring 24 is resiliently disposed between the spring holder 1b of the engine mount 1 and the pressure plate 17 so as to constantly bias the pressure plate 17 toward the lining plate 14. A cam plate 18 faces the pressure plate 17 via a cam ball 27, and is fixed to the end of the boss 1a with the use of a retaining ring 19. The pressure plate 17 is moved along the axis of of the output shaft under the cam action exerted by the rotation of the cam plate 18, thereby to cause the lining plate 14 to engage or disengage the clutch disc 5 rotatable with the output 4 for clutch engagement or disengagement.

A difference between the first example and this example is that the centrifugal clutch mechanism A is provided, which includes a guide plate 29 secured to the rotary member 12 and inclined at 29a, a cam plate 30 biased by the clutch spring 15 and inclined at 30a, and a centrifugal ball 31 interposed between both plates 29 and 30.

In this example, three centrifugal balls are positioned at equal intervals of 120°; however, the number of centrifugal balls is not critical, on condition that the cam plate 30 works reliably.

The embodiment operates as follows.

In the braking state as shown in the left half of FIG. 5, the centrifugal ball 31 is positioned in the deep positions of the respective inclined faces 29a and 30a of the guide and cam plate 29 and 30, and the lining plate 14 is engaged by the pressure plate 17, so that the clutch lining 16 is spaced away from the clutch disc 5.

To turn a cutting blade, the operating rod 22 is turned in its operating direction to cause upward movement of the pressure plate 17 under the action of the cam ball 27. Following the movement of the plate 17, the lining plate 14 moves toward the clutch disc 5 while it remains engaged with the pressure plate 17. When the clutch lining 16 contacts the clutch disc 5, the lining plate 14 initiates rotating in operative association with the rotation of the disc 5. While the revolution per minute of the plate 14 is limited, the centrifugal ball 31 is located inside of the cam plate 30.

However, when the pressure plate 17 moves further upwards, and that revolution per minute exceeds a certain value, the cam ball 31 is forced to move toward the outer edges of the guide and cam plates 29 and 30 along their inclined faces 29a and 30a due to its centrifugal force. In consequence, the clutch works gradually, so that the non-braking state as shown in the right half of FIG. 5 is reached, where the pressure plate 17 is spaced away from the lining plate 14, and the lining plate 14, the clutch disc 5 and the rotary member 12 rotate together.

According to the present invention, since the engine mount is integrated with the spring holder and the boss to which some operating means such as a pressure plate, a cam plate or the like are attached on the side of the engine mount, it is possible to bring the mechanisms such as a clutch disc, a rotary member and the like near the engine mount. As a result, the length, as viewed in the direction of the axis of the output shaft, and hence size of the arrangement can be decreased. Furthermore, the boss can easily be formed by cutting parallel with the axial bore through which the output shaft passes, and the pressure plate, cam plate and the like can be attached to the boss at a right angle with the output shaft, thereby to assure reliable clutch engagement or disengagement by smooth and reliable parallel movement of the pressure plate.

Further examples of the present invention will now be explained with reference to FIG. 6 to 8 inclusive.

Figure 6:
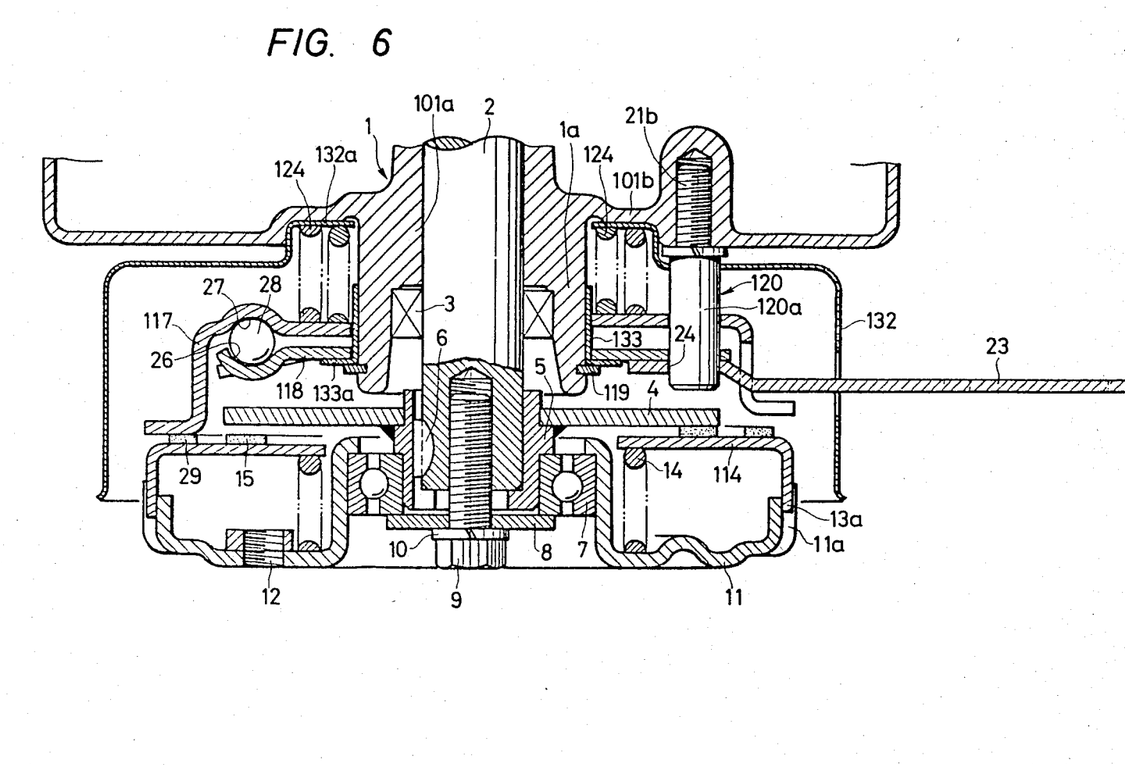
FIG. 6 is a sectioned front view, FIG. 7 a sectional view showing part of one example.
Figure 7:
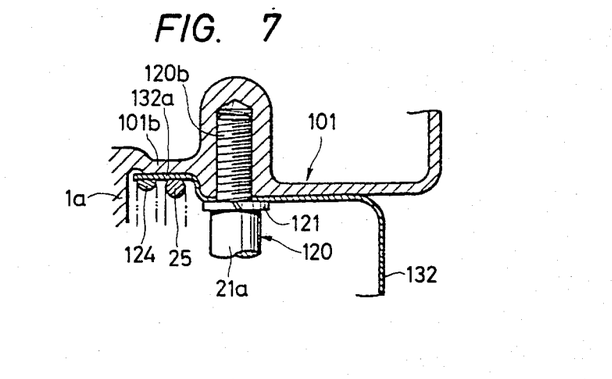

Referring to FIG. 6, an engine mount 101 includes a boss 101a which is provided with a recessed portion 101b around its part from which it is extended. Within that recessed portion is fitted a receiving portion 132a of a dust cover 132. Thus, the dust cover 132 having its receiving portion 132a closely fitted into the recessed portion 101b serves as locating means for restricting displacement relative to the boss 101a.

Around the boss 101a are disposed a pressure plate 117 and a cam plate 118 through a retainer 133 having a flange 133a.

The dust cover 132 is engaged with, and held on, the engine mount 101 by a brake spring 124, while the pressure plate 117 is always biased toward a lining plate 114.

To assemble these parts into place, the engine mount 101 is first threadedly provided therein with a bolt stopper 120. Next, the dust cover 132 is inserted through the straight portion 120a of the stopper 120 and directly attached to the engine mount 101 to which are in turn mounted the pressure plate 117 and the cam plate 118. Finally, a retaining ring 119 is fixedly fitted over the boss 110a. In this way, a spring washer 121 for preventing the turning of the bolt stopper 120 is located outside of the dust cover 132. As shown in FIG. 7, however, it is possible to locate the washer 121 inside of the cover 132 by inserting the threaded portion 120b of the bolt stopper 120 through the cover 132. The bolt stopper is then clamped in place when attaching receiving portion 132a of the dust cover 132 to the said recessed portion 101b. Thus, the dust cover 132 is engaged with, and held on, the engine mount 101 by the brake spring 132, while it is prevented from turning by the stopper bolt 120.

This example operates in the same manner as the first example.

Figure 8:
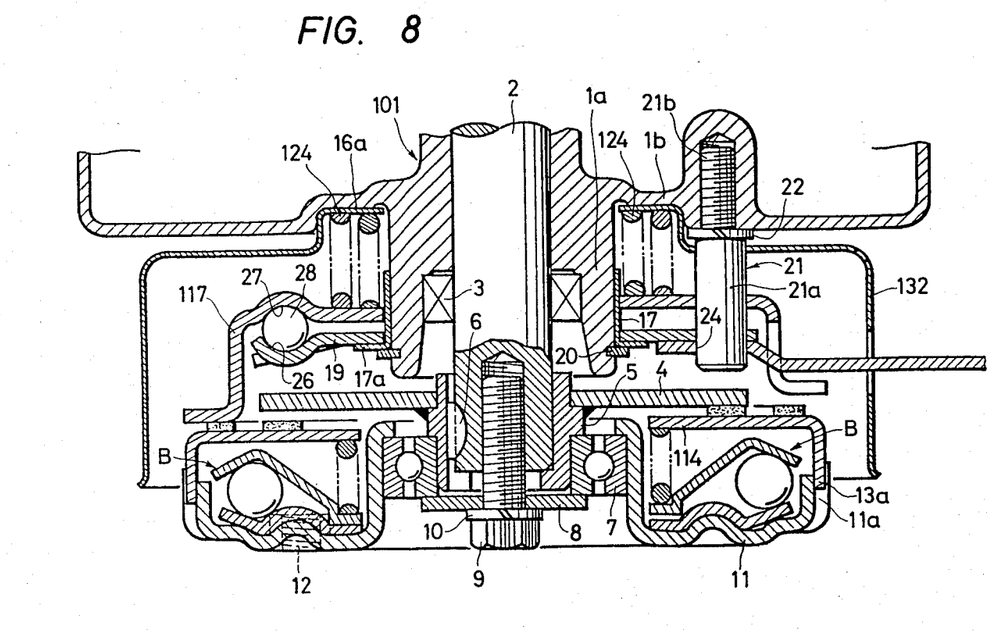
FIG. 8 is a sectioned front view showing another example including a centrifugal clutch mechanism.

FIG. 8 illustrates a still further example wherein the inventive clutch brake arrangement including a centrifugal clutch mechanism is applied a powered lawn mower.

This example is of a structure similar to the example of FIG. 6 in that a centrifugal clutch mechanism B is disposed between a rotary member 112 and a lining plate 114; a dust cover 132 is attached directly to an engine mount 101; a brake spring 124 is resiliently interposed between a pressure plate 117 and the dust cover 132; and the dust cover 132 is engaged with, and held on, the engine mount 101 by the brake spring 124. The centrifugal clutch mechanism B is similar in structure and operation to that shown in FIG. 5.

According to the present invention, the dust cover is attached directly to the engine mount, and between the dust cover and the pressure plate movable along the axial direction of the output shaft for the operation of the clutch brake is resiliently provided the brake spring, by which the said dust cover is engaged with, and held on, the engine mount. Thus, the dust cover is held by the brake spring which biases the pressure plate, so that any part for the attachment of the dust cover is dispensed with. As a result, the number of the parts involved is reduced, and the assembling of the dust cover is simplified and facilitated with improvements in working efficiency. In addition, since the dust cover is provided in such a manner that it covers the engine mount, it is unlikely that grass, weeds, earth and sand as well as mud may enter the arrangement from between the engine mount and the dust cover. Consequently, there is no fear that the accumulation and deposition of such foreign matters within the arrangement may disturb the smooth operation thereof.

What is claimed is:

1. A clutch brake arrangement for farm working machinery and the like, comprising an engine mount having an axial boss depending therefrom, said boss having a central axial bore extending therethrough, an output shaft extending through said bore, an annular recess surrounding said boss to function as a spring seat, a rotary member rotatably mounted on the lower end of said output shaft, an axially slidable lining plate mounted on said rotary member and rotatable therewith, said lining plate carrying, on its upper surface, an annular clutch lining and an annular brake lining disposed radially outwardly of said clutch lining, an axially slidable pressure plate mounted on said boss, a clutch disc disposed between said lining plate and said pressure plate and fixed to said output shaft for rotation therewith, said pressure plate being normally biased into engagement with said lining plate, a brake spring resiliently disposed between said spring seat and said pressure plate to constantly bias the pressure plate into engagement with said brake lining on said lining plate and to maintain said lining plate out of engagement with said clutch disc, a cam plate axially slidably mounted on said boss and opposed to said pressure plate, said pressure plate and cam plate, together, defining a ball clamp, and a cam ball riding in said ball clamp, said cam plate being held on said boss by a retaining ring, whereby when said cam plate is rotated, the cam action exerted by said ball causes said pressure plate to move axially out of engagement with said lining plate and to allow said lining plate to engage with said clutch disc.

2. A clutch brake arrangement as claimed in claim 1, further comprising a peripheral dust cover depending from said engine mount.

3. A clutch brake arrangement as claimed in claim 2, wherein said dust cover is integral with said engine mount.

4. A clutch brake arrangement as claimed in claim 2, wherein said dust cover comprises a depending side wall and a top wall with an axial opening therethrough to fit over said boss, said top wall being adapted to mount into said spring seat, whereby said dust cover is held in place by said brake spring.

5. A clutch brake arrangement as claimed in claim 1, further comprising stopper means for limiting the rotation of said cam plate.

6. A clutch brake arrangement as claimed in claim 5, wherein said stopper means is a pin depending from said engine mount and cooperating with an elongated slot in said cam plate.

7. A clutch brake arrangement as claimed in claim 6, wherein said pin is integral with said engine mount.

8. A clutch brake arrangement as claimed in claim 6, wherein said pin is threadedly attached to said engine mount.

9. A clutch brake arrangement as claimed in claim 1, wherein said lining plate is mounted on said rotary member through a centrifugal clutch means.

10. A clutch brake arrangement as claimed in claim 9, wherein said centrifugal clutch means comprises a lower plate fixed to said rotary member and being upwardly inclined at the outer end, an upper plate opposed to said lower plate and being downwardly inclined at the outer end, said upper plate being normally biased downwardly by a clutch spring disposed between said upper plate and said lining disc, and a ball disposed between said upper and lower plates at the inclined portions thereof.

* * * * *